May 13, 1969 R. ANDRES 3,443,834
PRESSURE-MEDIUM-ACTUATED LOCKING MECHANISM OF COVER OR
SIMILAR PARTS, ESPECIALLY OF CONVERTIBLE
TOPS FOR MOTOR VEHICLES
Filed June 7, 1967
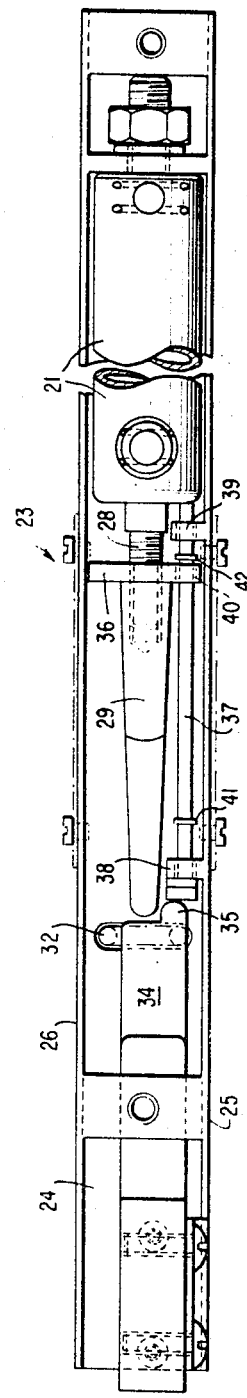
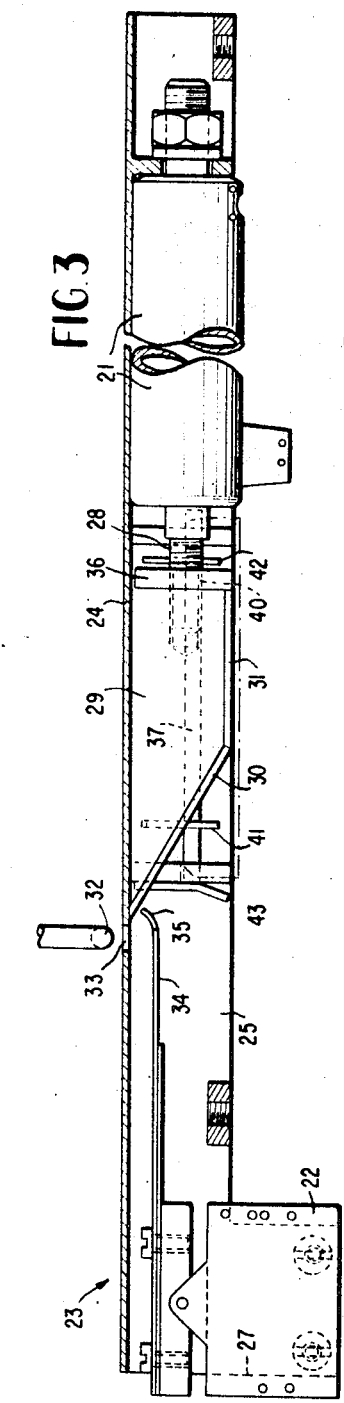
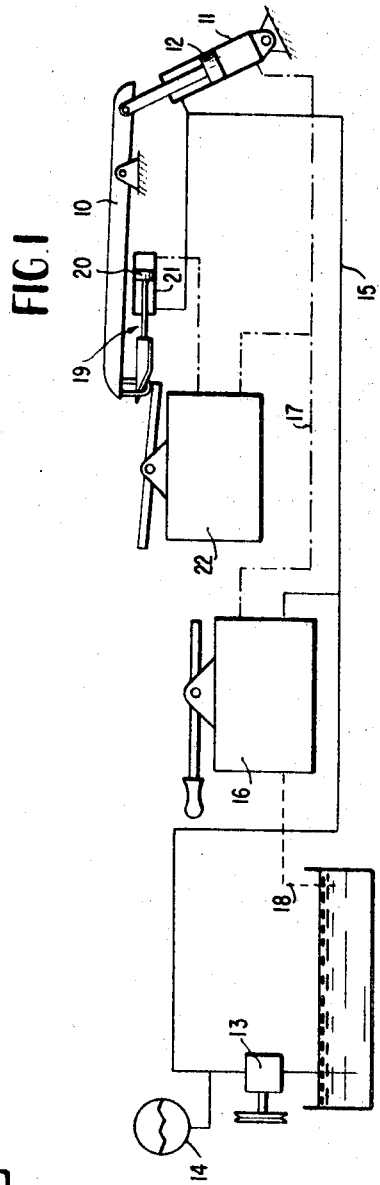
INVENTOR
RUDOLF ANDRES
BY
ATTORNEYS

United States Patent Office 3,443,834
Patented May 13, 1969

3,443,834
PRESSURE-MEDIUM-ACTUATED LOCKING MECHANISM OF COVER OR SIMILAR PARTS, ESPECIALLY OF CONVERTIBLE TOPS FOR MOTOR VEHICLES
Rudolf Andres, Sindelfingen, Germany, assignor to Daimler-Benz Aktiengesellschaft, Stuttgart-Unterturkheim, Germany
Filed June 7, 1967, Ser. No. 644,394
Claims priority, application Germany, June 7, 1966, D 50,264
Int. Cl. B60j 7/18
U.S. Cl. 296—121                                                      25 Claims

ABSTRACT OF THE DISCLOSURE

A locking arrangement, actuated by a pressure medium, for cover and similar parts, especially for convertible tops in motor vehicles, in which the working piston adapted to raise or lower the convertible top is supplied continuously with a pressure medium on the smaller piston surface of its double-acting piston from a source of hydraulic pressure medium, while a pressure-medium switch is adapted to selectively connect the larger piston surface of the working piston either with the source of pressure or a discharge connection, depending on whether the top is to be raised or lowered, and in which the pressure line supplying the smaller piston surface of the working piston is also in constant communication with the smaller piston surface of the double-acting closure piston whose larger piston surface is adapted to be connected with the pressure line leading to the larger piston surface of the working piston by means of a further hydraulic switch, which itself is automatically actuated by a part of the locking mechanism. The latching and locking mechanism itself may be secured and/or accommodated within a U-shaped rail which is fastened to a part of the top and accommodates the cylinder containing the closure piston whose piston rod is connected to a wedge-shaped latching member adapted to engage in an eye or lug of the convertible top, itself adapted to pass through an aperture of appropriate shape provided in the rail. The switch controlling the supply of pressure medium to the larger surface of the closure piston is automatically controlled in such a manner that upon engagement of the eye or lug through the elongated aperture, the pressure medium is supplied to the larger piston surface so as to cause engagement of the latching member with the eye or lug; however, during opening or lowering of the top, the switch actuating lever for the hydraulic switch of the closure piston is held in the pre-existing condition for the most part of the stroke of the closure piston so that the discharge connection now effective on the larger piston surface of the working piston is also effective on the larger piston surface of the closure piston, and this switch lever is shifted only in the last part of the stroke of the closure piston.

Background of the invention

The present invention relates to a pressure-medium-actuated locking mechanism for two mutually movable cover or similar parts, especially of convertible tops for motor vehicles, whereby a closure piston at the first part, which is controlled by a pressure medium switch, engages in an eye, lug or the like, at the second part.

Summary of the invention

The present invention has as its purpose to lock in a satisfactorily and unobjectionably tight manner the cover part, especially the top, during the raising or closing of the top over the open vehicle body on the forward roof frame or windshield frame by overcoming the inherent, internal stress of the top material. Each convertible top material is dependent in its stretchability on the type and duration of the influences of the atmospheric air, degree of temperature, moisture, component parts of the air, etc. so that oftentimes considerable forces are necessary for the raising or closing. The counterforces of the elastic sealing and/or abutment means has to be added thereto which have to be overcome during the closing. Furthermore, damages as a result of premature initiation of the opening movement are to be avoided by a corresponding construction of the closure and locking mechanism.

In solution to the underlying problems, the present invention proposes that with the locking mechanisms of the aforementioned type, the closure piston actuated by pressure medium is provided with a wedge-shaped latching member for the engagement into the eye, lug or the like at the second part and in that the pressure-medium switch controlling the closure piston is automatically movable by the eye, lug or the like into its position releasing the closure force and is adapted to be locked in this position over the largest part of the stroke of the closure piston by a locking member coordinated to the closure piston or to the wedge-shaped latching member thereof.

It is primarily contemplated thereby to select the relatively fixed part, for example, the vehicle body as first part and the cover part, for example, the top as second part, though a reversed arrangement is naturally within the scope of the present invention. Furthermore, pressure oil or another hydraulic liquid will be used primarily as pressure medium. The top itself may be actutable either manually or by an auxiliary force, i.e., in the latter case for the most part by means of one or several pressure-medium actuated working pistons.

For the last-mentioned case, the present invention can be further developed in that both this working piston as well as also the closure piston are constructed double-acting and are held in the opening position by constant pressure acting on their smaller piston surfaces and supplied by way of a pressure line, and in that the line leading to the larger piston surface of the working piston is connected to a pressure medium switch. The line leading to the larger piston surface of the working piston is then adapted to be selectively connected by means of the pressure medium switch either with a pressure connection or with a discharge connection. The last-mentioned actuation can take place either manually or automatically.

The present invention offers the advantage that a relatively large closure force which remains constant, can be applied which is initiated or released automatically. This force does not need to be supplied by the actuation of the second part, for example, by the top actuation. Hence, this actuation can be realized only with small forces and therefore with slight expenditures. During opening, the hydraulic switch is initially still closed or blocked and is then released only in the last part of the stroke of the closure piston when the eye or lug of the second part has already been released by the wedge-shaped latching member of the first part. It is additionally assured thereby that the closure piston is actually returned to the end position thereof.

With one embodiment according to the present invention, which is intended for the locking of a convertible top of motor vehicles, the pressure-medium cylinder together with its closure piston is arranged at the roof part of a motor vehicle within an approximately U-shaped rail and the wedge-shaped latching member is secured on the piston rod of the closure piston; a transversely disposed, elongated aperture is located in front of the tip of the wedge-shaped latch member—in its open position— within the rail for the passage of the eye or lug, while the end of the switch lever of the pressure medium switch is located below this elongated aperture. The U-shaped rail thereby forms with its base a part of the abutment for the top whereby naturally sealing strips or the like are additionally interposed. The wedge-shaped latching member may abut with its tip and with its upper surface against the inner side of the base of the U-shaped rail and its wedging surface may pass over approximately at about half of its over-all length into a lower surface at least approximately parallel to the U-shaped rail. The wedging surface and the lower surface at the latching part are then appropriately shaped corresponding to the inner contour of the eye or lug.

The construction and arrangement of the hydraulic switch, as such, is left to a person skilled in the art. However, the present invention prefers a solution according to which the hydraulic switch is secured at the end of the U-shaped rail opposite the closure piston and its switching lever tiltable about a cross axis is constructed as leaf spring whose end is bent up directly at the tip of the wedge-shaped latching member in the direction toward the base of the U-shaped rail. The wedge-shaped latching member is non-rotatably guided in the U-shaped rail, for example, by means of a rectangular plate which may be disposed at the end thereof adjoining the piston rod.

According to the present invention, a locking rod is displaceably arranged adjacent the wedge-shaped latching member within guide means of the U-shaped rail which locking rod carries at its end facing the switch lever a locking plate for engagement into the bent-up switch lever extension and which is adapted to be moved by the wedge-shaped latching member by means of entrainment elements.

Appropriately, the guide place at the wedge-shaped latching member thereby acts as entrainment means and the locking rod extends through this guide plate in a bore. Two abutments or stops for the guide plate acting as entrainment means are arranged on the locking rod whereby the distance of the abutment at the locking rod end facing the switch lever to the coordinated guide means in the U-shaped rail corresponds to the engaging depth of the locking plate at the switch lever end.

Accordingly, it is an object of the present invention to provide a locking mechanism for movable parts, especially for convertible tops of motor vehicles which is simple in construction and reliable in operation and effectively eliminates the aforementioned shortcomings and drawbacks encountered with the prior art constructions.

A further object of the present invention resides in a pressure-medium actuated closure mechanism of the type described above which enables the application of a relatively large constant closure force that need not be supplied by the force for the actuation of the movable parts.

A further object of the present invention resides in a closure and latching mechanism for relatively movable parts, especially for convertible tops of motor vehicles in which the latching and locking can be realized exclusively with small forces and therefore involves relatively slight expenditures.

Still another object of the present invention resides in such closure and locking mechanism for convertible tops of motor vehicles as will assure actuation of the locking mechanism in its opening direction only after the latching member has safely released the lug or eye on the movable part.

These and further objects, features and advantages of the present invention will become more obvious from the following description when taken in connection with the accompanying drawing which shows, for purposes of illustration only, one embodiment in accordance with the present invention, and wherein:

FIGURE 1 is a schematic view of the over-all installation for the locking and actuating of a convertible top of a motor vehicle;

FIGURE 2 is a bottom plan view on the support and locking rail of the locking mechanism in accordance with the present invention; and FIGURE 3 is a longitudinal cross-sectional view through the rail of FIGURE 2.

Referring now to the drawing wherein like reference numerals are used throughout the various views to designate like parts, and more particularly to FIGURE 1, the vehicle top 10 which is not illustrated in detail and may be of any known, conventional construction, is equipped with a hydraulic working cylinder 11 for its closing and opening movement, i.e. for raising and lowering the top 10. The piston 12 of the working cylinder 11 engages with its piston rod at the top 10. The pressure medium is supplied constantly in a conventional manner from an engine-driven pump 13 by way of a pressure tank 14 into a pressure line 15 through which the pressure oil acts on the smaller surface at the piston 12. A line 17 leads from the pressure line 15 by way of the hydraulic switch 16 to the large surface at the piston 12. The hydraulic switch 16, upon its actuation, connects the line 17 either with the return (discharge) line 18 or with the pressure line 15.

A latching and locking mechanism generally designated by reference numeral 19 and to be described more fully hereinafter is disposed in the forward edge of the fixed roof frame or of the upper rim at the windshield frame whose closure piston 20 is arranged within a pressure cylinder 21.

Also in this closure mechanism the smaller piston surface of the double-acting closure piston 20 is connected with the line 15, i.e. is constantly acted upon by the pressure medium whereas the larger piston surface is connected with the line 17 by way of the hydraulic switch 22. Both hydraulic switches 16 and 22 may be of any conventional construction and form no part of the present invention so that a description of the details thereof is dispensed with herein. The switch 22 normally blocks or closes this connection between line 17 and the larger piston surface of closure piston 20 but releases or opens up this connection if it is actuated by the top 10 itself in a manner to be described more fully hereinafter.

According to FIGURES 2 and 3, a U-shaped rail generally designated by reference numeral 23 is arranged in the roof frame whose base 24 faces the top. The pressure cylinder 21 is arranged between its leg portions 25 and 26. The hydraulic switch 22 (FIGURE 3) is secured at the opposite end of the U-rail 23 at the downwardly facing tab 27.

The wedge-shaped latching member 29 is secured on the piston rod 28 of the closure piston 20, not visible in these figures, in any conventional manner. The wedge-shaped latching member 29 abuts with its upper surface against the base 24 of the U-rail 23. Its wedging surface 30 extends approximately over half of its entire length and then passes over into a lower surface 31 which extends essentially parallel to the U-rail 23. These two surfaces 30 and 31 are rounded off and the contour thereof is matched to the catch lug or eye 32 located at the top 10.

A transversely disposed elongated aperture 33 is provided in the base 24 of the U-rail 23 directly in front of the tip of the wedge-shaped latching member 29 for the passage therethrough of this lug or eye 32. The hydraulic switch 22 is actuated by a switch lever, which is constructed as leaf spring 34 and extends with its end up to within the area below the elongated aperture 33. An extension 35 is provided at this end of the switch lever 34 laterally adjacent the wedge-shaped latching member 29 which extension 35 is bent in the upward direction, i.e. in a direction toward the base 24 of the U-rail 23.

The latching member 29 is guided within the U-shaped rail 23 by means of a rectangular guide plate 36 which is arranged at its end directly on the connection to the piston rod 28. The plate 36 is matched to the inner contour of the U-shaped rail 23 and serves simultaneously as entrainment member for a locking rod 37 which is displaceably arranged laterally adjacent the latching member 29 within guide means 38 and 39 of the U-shaped rail 23. The locking rod 37 extends through the guide plate 36 within a bore 40. Stops 41 and 42 are arranged on the locking rod 37 outside of the guide plate 36 and act as entrainment elements. These stops 41 and 42 are so arranged within the stroke range of the closure piston 20 that the locking rod 37 is taken along only during the last, short portion of the closure piston stroke by the wedge-shaped latching member 29. The locking rod 37 carries at its end facing the switch 22 a locking plate 43 which is adapted to cooperate with the extension 35 of the switch lever 34.

Operation

In the position illustrated in FIGURES 2 and 3, the top is open and both the working piston 12 as also the closure piston 20 are under pressure on their smaller piston surface by way of the line 15. If now, by corresponding actuation of this switch 16, the top is closed, then the illustrated position of the locking mechanism remains at first. If, however, the lug or eye 32 enters through the elongated aperture 33 in the U-shaped rail 23, it encounters and impinges on the switch lever 34 and takes the same along in a downward direction. As a result thereof, the switch 22 is shifted into its other position and now connects the working line 17, which is under pressure, with the larger piston surface of the closure piston 20. The latter therefore begins to move toward the left as viewed in the drawing.

As a result thereof, the wedge-shaped latching member 29 engages with its tip into the lug or eye 32 and pulls the same completely downwardly up to the lower end position until the lug or eye 32 rests on the lower surface 31 of the latching member 29. In this position, the lug or eye 32 and therewith the top is securely locked against opening. During the last part of the stroke, the guide plate 36 acting as entrainment has seized the stop 41 and has displaced the locking rod 37 together with the locking plate 43 over such a distance that the extension 35 lies below the locking plate 43.

If the switch 16 is now actuated from the closed position for purposes of opening or lowering the top, then the line 17 is connected with the discharge connection. Since the switch 22 is initially still open, also the closure piston 20 is relieved of the pressure acting on its larger piston surface; for the connection with the line 17 continues to remain in existence. Under the constant pressure from the line 15, the closure piston 20 together with the wedge-shaped latching member 29 therefore begin to move back again toward the right. The surface 31 at the latching member 29 after a short stroke releases the lug or eye 32 and the working piston 12 can now pull the lug or eye 32 and therewith the top in the upward direction. However, the switch lever 34 of the switch 22 is thereby still held in its lower position by the locking plate 43 so that the connection between the pressure cylinder 21 and the line 17 continues to remain in existence. Only in the last part of the stroke at the closure piston 20 and the latching member 29, i.e., when the lug or eye 32 has already left the U-shaped rail 23, the guide plate 36 acting as entrainment takes along toward the right the stop 42. The locking plate 43 now releases the switch lever 34 and the latter is returned by a spring force (not shown) into its original upper position. As a result thereof, the connection to the line 17 is interrupted and the closure piston 20 is blocked in its open position. The locking mechanism is now ready again for the next closing or raising operation of the vehicle top.

While I have shown and described one embodiment in accordance with the present invention, it is understood that the same is not limited thereto but is suceptible of numerous changes and modifications as known to a person skilled in the art, and I therefore do not wish to be limited to the details shown and described herein, but intended to cover all such changes and modifications as are encompassed by the scope of the appended claims.

I claim:

1. A locking mechanism, actuated by a pressure medium, for cover or similar parts, especially for convertible tops of motor vehicles, comprising a first part and a second part, said first and second parts being movable relative to one another, closure piston means at one of said parts which is actuated by a pressure medium, switch means for the pressure medium of said closure piston means, lug means at the other part, said closure piston means including a wedge-shaped latch means for engagement in said lug means, the switch means controlling the pressure medium for the closure piston means being automatically movable by said lug means into a position, wherein the closure piston means is actuated for engagement in said lug means, and locking means coordinated to said piston means for locking the switch means in said last-mentioned position during the largest part of the stroke of the closure piston means.

2. An arrangement according to claim 1, further comprising working piston means actuated by a pressure medium and operatively connected with the part to be closed, said working piston means as well as said closure piston means being constructed double acting and being retained in the opening position by constant pressure on the smaller piston surfaces thereof, and line means leading to the larger piston surfaces of the closure piston means and of the working piston means, the line means leading by way of said switch means to the larger piston surface of the closure piston means being operatively connected with the line means leading to the larger piston surface of the working piston means.

3. An arrangement according to claim 2, wherein the line means leading to the larger piston surface of the working piston means is adapted to be selectively connected either with a pressure source or a discharge connection by another pressure medium switch means.

4. A locking arangement for the roof of a convertible top of a motor vehicle according to claim 3, further comprising approximately U-shaped rail means secured at a roof part of the vehicle, pressure medium cylinder means containing the closure piston means and arranged in said rail means, said closure piston means having a piston rod, the wedge-shaped latch means being secured on said piston rod, said rail means being provided with a transversely disposed, elongated aperture in front of the tip of said latch means, with the latter in the open position, for passage of the lug means, and shifting lever means operatively connected with the first-mentioned pressure medium switch means, the end of the shifting lever means being disposed below said aperture.

5. An arrangement according to claim 4, wherein the wedge-shaped latch means abuts with its tip and with its upper surface against the inside of the base of the U-shaped rail means, the wedging surface of said latch means passing over at approximately half of its over-all length into a lower surface which is a least approximately parallel to the rail means.

6. An arrangement according to claim 5, wherein the wedging surface and the lower surface of said latch means are shaped corresponding to the inner contour of the lug means.

7. An arrangement according to claim 6, wherein the first-mentioned hydraulic switch means is secured at the end of the rail means opposite the closure piston means, the shifting lever means for said switch means being pivotal about a transverse axis and being constructed as leaf spring means whose end, directly at the tip of the wedge-shaped latch means, is bent in the direction toward the base of the rail means.

8. An arrangement according to claim 7, further comprising means for non-rotatably guiding said wedge-shaped latch means in said rail means including a substantially rectangular plate fitting the inner contour of the rail means.

9. An arrangement according to claim 8, wherein said locking means includes locking rod means displaceably arranged adjacent the wedge-shaped latch means within guide means of the U-shaped rail means, said locking rod means carrying at the end facing the shifting lever means a locking plate for engagement with the bent shifting lever extension, and entrainment means to enable displacement of said locking rod means by the wedge-shaped latch means.

10. An arrangement according to claim 9, wherein the guide plate at the latch means is operative as entrainment means for said locking rod means, and the locking rod means extends through the guide plate in a bore.

11. An arrangement according to claim 10, further comprising two steps on the locking rod means for the guide plate, acting as entrainment means, the distance of the one stop, which is located at the end of the locking rod means facing the shifting lever means, to the associated guide means in the rail means corresponding to the engaging depth of the locking plate at the shifting lever end.

12. A locking ararngement for the roof of a convertible top of a motor vehicle according to claim 1, further comprising approximately U-shaped rail means secured at a roof part of the vehicle, pressure medium cylinder means containing the closure piston means and arranged in said rail means, said closure piston means having a piston rod, the wedge-shaped latch means being secured on said piston rod, said rail means being provided with a transversely disposed, elongated aperture in front of the tip of said latch means, with the latter in the open position, for the passage of the lug means, and shifting lever means operatively connected with the first-mentioned pressure medium switch means, the end of the shifting lever means being disposed below said aperture.

13. An arrangement according to claim 12, wherein the wedge-shaped latch means abuts with its tip and with its upper surface against the inside of the base of the U-shaped rail means, the wedging surface of said latch means passing over at approximately half of its over-all length into a lower surface which is at least approximately parallel to the rail means.

14. An arrangement according to claim 13, wherein the wedging surface and the lower surface of said latch means are shaped corresponding to the inner contour of the lug means.

15. An arrangement according to claim 14, wherein the first-mentioned hydraulic switch means is secured at the end of the rail means opposite the closure piston means, the shifting lever means for said switch means being pivotal about a transverse axis and being constructed as leaf spring means whose end, directly at the tip of the wedge-shaped latch means, is bent in the direction toward the base of the rail means.

16. An arrangement according to claim 15, further comprising means for non-rotatably guiding said wedge-shaped latch means in said rail means including a substantially rectangular plate fitting the inner contour of the rail means.

17. An arrangement according to claim 16, wherein said locking means includes locking rod means displaceably arranged adjacent the wedge-shaped latch means within guide means of the U-shaped rail means, said locking rod means carrying at the end facing the shifting lever means a locking plate for engagement with the bent shifting lever extension, and entrainment means to enable displacement of said locking rod means by the wedge-shaped latch means.

18. An arrangement according to claim 17, wherein the guide plate at the latch means is operative as entrainment means for said locking rod means, and the locking rod means extends through the guide plate in a bore.

19. An arrangement according to claim 18, further comprising two stops on the locking rod means for the guide plate acting as entrainment means, the distance of the one stop, which is located at the end of the locking rod means facing the shifting lever means, to the associated guide means in the rail means corresponding to the engaging depth of the locking plate at the shifting lever end.

20. An arrangement according to claim 12, wherein the first-mentioned hydraulic switch means is secured at the end of the rail means opposite the closure piston means, the shifting lever means for said switch means being pivotal about a transverse axis and being constructed as leaf spring means whose end, directly at the tip of the wedge-shaped latch means, is bent in the direction toward the base of the rail means.

21. An arrangement according to claim 12, further comprising means for non-rotatably guiding said wedge-shaped latch means in said rail means including a substantially rectangular plate fitting the inner contour of the rail means.

22. An arrangement according to claim 12, wherein said locking means includes locking rod means displaceably arranged adjacent the wedge-shaped latch means within guide means of the U-shaped rail means, said locking rod means carrying at the end facing the shifting lever means a locking plate for engagement with the bent shifting lever extension, and entrainment means to enable displacement of said locking rod means by the wedge-shaped latch means.

23. An arrangement according to claim 22, further comprising means for non-rotatably guiding said wedge-shaped latch means in said rail means including a substantially rectangular plate fitting the inner contour of the rail means.

24. An arrangement according to claim 23, wherein the guide plate at the latch means is operative as entrainment means for said locking rod means, and the locking rod means extends through the guide plate in a bore.

25. An arrangement according to claim 24, further comprising two stops on the locking rod means for the guide plate acting as entrainment means, the distance of the one stop, which is located at the end of the locking rod means facing the shifting lever means, to the associated guide means in the rail means corresponding to the engaging depth of the locking plate at the shifting lever end.

References Cited

UNITED STATES PATENTS

| | | | |
|---|---|---|---|
| 2,739,012 | 3/1956 | Ziff | 296—120 |
| 3,135,541 | 6/1964 | Kwasek | 296—120 X |
| 3,266,838 | 8/1966 | Heincelman | 296—121 |

LEO FRIAGLIA, *Primary Examiner.*

JOEL E. SIEGEL, *Assistant Examiner.*

U.S. Cl. X.R.

296—107